Patented Dec. 9, 1941

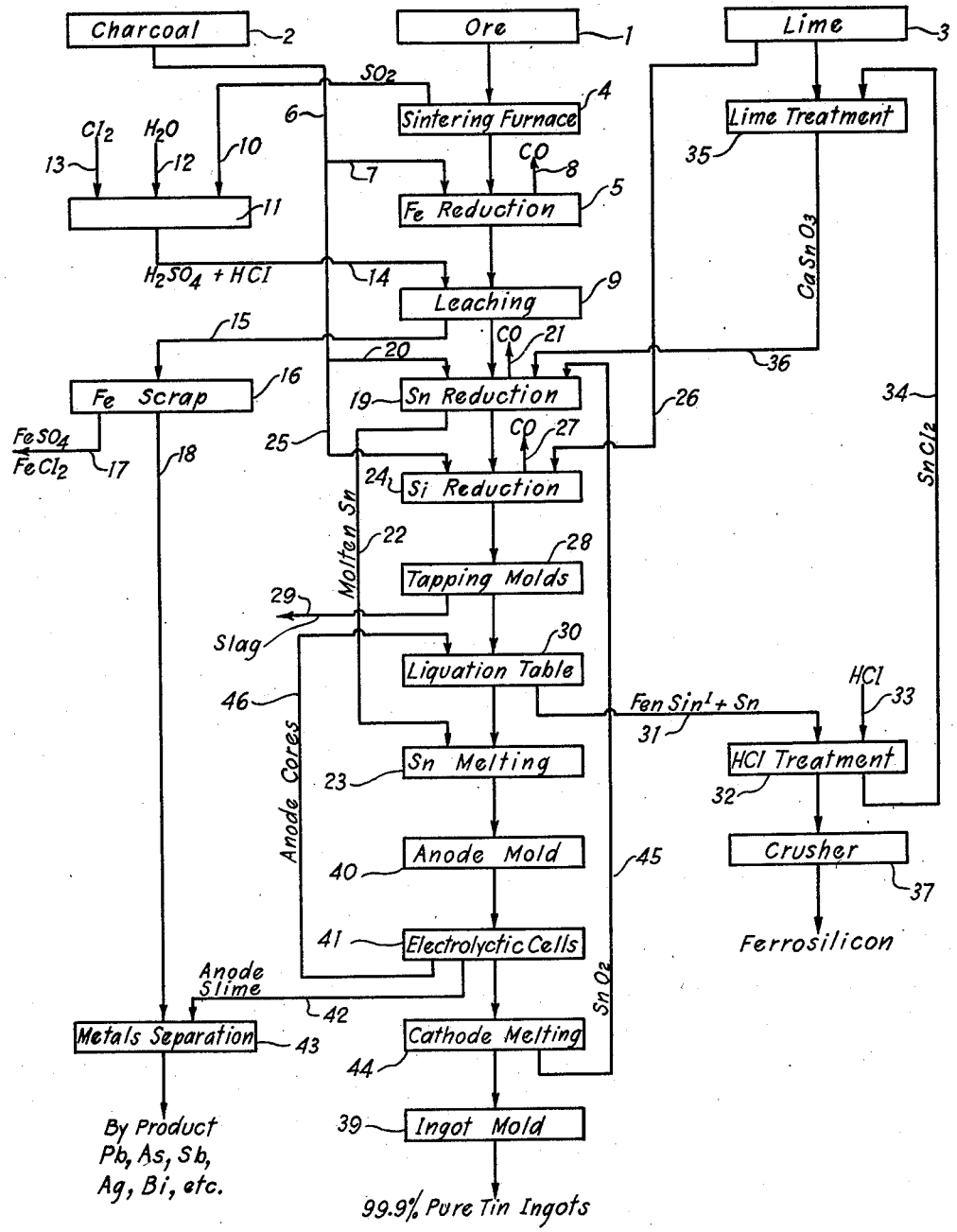

2,265,219

UNITED STATES PATENT OFFICE 2,265,219

PROCESS FOR RECOVERING VALUES FROM METAL BEARING MATERIALS

Lucien C. Sturbelle, Niagara Falls, N. Y., assignor to Hooker Electrochemical Company, Niagara Falls, N. Y., a corporation of New York Application December 5, 1940, Serial No. 368,654

15 Claims. (Cl. 75—85)

My invention relates more particularly to a process for extracting metals from ores or other materials containing iron and tin or their oxides, with or without one or more of the other metals frequently associated therewith such as lead, arsenic, antimony, copper, silver, bismuth, etc. One object of my invention is to break up or prevent the formation of compounds of iron with tin, and the consequent loss of the tin. Another object of my invention is to recover the iron itself as the valuable alloy ferrosilicon. In short, the objects of my invention are to reduce loss and increase the recovery of metals from materials of the class referred to, thereby rendering practicable the processing of ores heretofore thought to be of too low a grade to have commercial value, as well as the recovery of values from heretofore discarded industrial waste materials.

The smelting of tin ores began in England with ores that were rich in tin and required very little treatment beyond a reduction with carbon. As the demand for tin grew, ores from other sources had to be imported. The best of these contained a little iron. Following earlier practice, these ores were reduced at a temperature that melted the iron and caused it to combine with the tin, forming $FeSn_2$. This alloy melts at 950° C., whereas tin melts at 232° C. It therefore appears in the tin as lumps known as "hard heads." The recovery of the tin from this alloy is at present considered to be commercially uneconomical. This alloy contains over 80 per cent tin. If the original ore contained 40 per cent tin and 10 per cent iron, when processed in accordance with the prior art the tin would all combine with the iron. Therefore, when dealing with low grade ores, it has heretofore been necessary to crush and concentrate them on riffle tables to a point at which the concentrated ore contained at least 60 per cen tin and not over 2 per cent iron. The discarded ore contained approximately 10 per cent of the original tin, and this was lost to the mine owner and to the industry. By my process I am able to process without difficulty not only the 40 per cent ore above referred to, but even the tailings from the old workings containing the tin heretofore discarded.

In the carrying out of my process, the ore is preferably first concentrated on riffle tables, if necessary, until it contains 40 per cent tin. If it contains sulphur it is then sintered at 900° to 950° C., whereupon the sulphur comes off as $SO_2$. This is reacted with water in presence of chlorine, producing a mixture of sulphuric and hydrochloric acids, in accordance with the following reaction:

$$SO_2 + 2H_2O + Cl_2 \rightarrow H_2SO_4 + 2HCl \qquad (1)$$

The ore is then calcined with a reducing agent. For this purpose I may use coal, coke, charcoal, sawdust or carbon monoxide, depending on the available supply and relative cost of these agents. Iron is reduced by carbon at approximately 450° C. This operation is therefore preferably carried on at a temperature between 450° and 700° C., at which latter temperature the tin begins to be reduced. In practice I prefer to carry out this step at about 600° C. This operation therefore reduces the iron, but not the tin. Some of the other metals that are liable to be present in minor quantity, such as copper, silver, lead antimony, arsenic, bismuth etc., are likewise largely reduced. Any oxides of aluminum, calcium, magnesium and silicon that may be present are unreduced. The calcined ore is then leached with acids, which may have been derived in whole or in part from Reaction 1. This removes most of the iron and other reduced metals. It is to be noted, however, that although this leaching takes out a large part of the iron, it does not get rid of all of it. The importance of avoiding conditions that cause formation of $FeSn_2$ is therefore diminished, but not altogether eliminated. The solution resulting from this leaching is then passed in contact with a large surface of iron, which may be in the form of scrap. The iron replaces the less reactive metals of the salts in the solution and causes them to be precipitated. The iron salts can be subsequently processed or allowed to go to waste. The $SnO_2$ and other materials left after the leaching operation may be dried by means of heat from the exhaust gases of the sintering or iron reduction furnace.

The residual solids are then transferred to another furnace in which the tin is to be reduced and there treated with reducing agents. For this purpose I may use any of the reducing agents above mentioned and, in addition, I may also use hydrogen or a mixture of carbon monoxide and hydrogen, such as is found in water gas, blau gas, city illuminating gas etc., which could not be used in the first or iron reduction step, because when hydrogen is one of the reducing agents employed the tin starts to reduce before the iron. In this reduction care is exercised to avoid melting of the residual iron and slagging of the alumina and alkaline earth compounds that are liable to be present. For rapid and complete reduction of stannic oxide by hydrogen a final temperature of at least 700° C. is required, and iron melts at 1530° C. This operation must therefore be kept within these temperature limits. It is preferably carried out at a temperature between 900° and 950° C., if carbon is the reducing agent, or 700° and 750° C., if hydrogen is the reducing agent The tin is thus reduced and melted. The aluminum, silicon and alkaline earth metals above referred to remain as their oxides.

A part of the molten reduced tin may sometimes be drained away from the second or tin reduction furnace and passed to a melting pot, where it is kept molten, pending recovery of the balance of the tin. The balance of the tin remains trapped in the gangue.

The solids from the second or tin reduction furnace, consisting of residual iron, oxides of aluminum, silicon and the alkaline earth metals, and such quantities of tin and other metals as failed to drain away in the previous step, are then transferred to a third reduction furnace, in which the silicon is to be reduced and the silicon and iron melted. As the reduction of silicon by carbon requires a temperature of at least 1200° C., and silicon melts at 1420° C., and iron at 1530° C., and the slagging of the gangue requires a temperature of at least 1600° to 2050° C., depending upon the proportions of SiO₂ and Al₂O₃ the third or silicon reduction furnace is preferably electric.

The composition of the solids left after the second or tin reduction step, having been ascertained by analysis, or being known from previous operations, a calculated quantity of charcoal or other solid carbonaceous reducing agent is introduced into the electric furnace. If the quantity of silica naturally present is insufficient to form ferrosilicon with the iron, it may be necessary to add silica, preferably in the form of silica sand or quartz. Similarly, if the quantity of alumina naturally present is insufficient to form with the lime a fluid slag, it may be necessary to add alumina in the form of bauxite or china clay. The respective quantities of charcoal, lime, silica and alumina, if any, to be added, are calculated to reduce the silicon dioxide and slag the aluminum, according to the following reactions:

$$SiO_2 + 2C \rightarrow Si + 2CO \qquad (3)$$
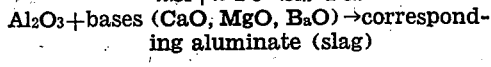
$$nSi + n'Fe \rightarrow Si_n Fe_{n'} \qquad (4)$$
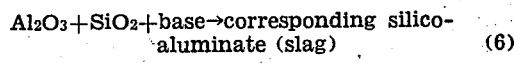
$$Al_2O_3 + bases\ (CaO, MgO, BaO) \rightarrow corresponding\ aluminate\ (slag) \qquad (5)$$

or, if there is an excess of silicon, $$Al_2O_3 + SiO_2 + base \rightarrow corresponding\ silico\text{-}aluminate\ (slag) \qquad (6)$$

In the electric furnace the materials are introduced at the top and the temperature increases from the top toward the bottom. The upper part is occupied by solid granular materials. As these materials pass downward, the tin is the first metal to melt. Below the zone in which the tin melts is a zone in which the silicon reduces and melts. Below that zone is one in which the iron melts and combines with the molten silicon to form ferrosilicon, which melts at 1200° C. to 1500° C. In the next lower zone the gangue slags and collects. This is quite fluid at the temperatures under consideration. The molten tin and ferrosilicon drip through the layer of molten slag and form pools below it. Although some of the molten tin may come in contact with molten iron, this does not result in production of the undersired FeSn₂, as it would if the iron were allowed to melt in the second or tin reduction furnace. This may be because the affinity of silicon for iron is greater than that of tin. It is also possible that some FeSn₂ does form and is broken up in a lower zone. At any rate, no FeSn₂ appears in the products. Below the layer of slag a layer of ferrosilicon forms, and below this, in the bottom of the furnace, the molten tin collects. All of the tin therefore drips through a layer of ferrosilicon and comes into intimate contact with it.

It should be noted that in my process as above described, the tin having been released by slagging of the gangue, no tin can remain in the gangue. Hence one cause of loss of tin, which in the prior art was always more or less serious, is in my process completely eliminated.

It should also be noted that, since in my process the silicon is largely reduced and subsequently removed as ferrosilicon, the quantity of slag produced in the electric furnace is relatively low, even when dealing with very low grade ores.

The slag, being a material of high electrical resistance, may be allowed to build up and contact the electrode above it but the ferrosilicon must not be allowed to do this as it would short circuit the furnace.

From time to time, the molten charge is drawn off from the furnace into conical molds in which it immediately reforms the three layers above described. When solidified, the slag is broken away and discarded. The tin is likewise broken away from the ferrosilicon. Tin is slightly soluble in ferrosilicon and a film of tin adheres to the interface. The lumps of ferrosilicon and tin are therefore placed on a liquating table and heated to a temperature that will melt the tin but not the ferrosilicon. The tin is thus separated from the ferrosilicon as far as readily practicable and drained away from the liquating table to the melting pot above referred to, where it is kept molten preparatory to the next step. The lumps of ferrosilicon are leached with HCl. The SnCl₂ thus formed is treated with lime, converting it to CaSnO₃. This is returned to the second or tin reduction furnace.

If the tin in the melting pot is found to be of sufficient purity for its intended market, it is cast directly into ingots. Otherwise it is cast into anodes and electrolyzed in a bath of SnSO₄. The tin recovered from the cathodes of the electrolytic cells has a purity of over 99.9 per cent. This is cast into ingots for the market.

After the electrolytic treatment, what remains of the anodes contains the by product metals that were not removed in the first leaching step, and constitutes what is known as the "anode slime." This slime, together with the metals precipitated by the iron scrap after the first leaching step, is treated for separation of the metals in a sequence of operations that depends upon the metals present. As the details of this part of the process form no part of the present invention, they will not be discussed further. The metals that may be found in these by products may include lead, arsenic, antimony, bismuth, copper, silver, etc. Although in the class of ores under consideration they are generally in quite minor quantities, they may have substantial value.

In the figure I have illustrated the above described process diagrammatically. 1, 2 and 3 are storage bins for the ore, carbon and lime respectively. 4 is the sintering apparatus, which may be of the well known Dwight-Lloyd type.

It is to be understood that this furnace, as well as the iron and tin reduction furnaces to be later indicated, are operated by heat from a source not indicated.

The solids from sintering furnace 4 are transferred to the first or iron reduction furnace 5. Carbon is conducted from bin 2 to furnace 5 by conveyers 6 and 7. The CO formed by the reduction escapes at 8.

The residues from furnace 5 are transferred to leaching vat 9. SO₂ is drawn off from the sintering furnace 4 through conduit 10 and conducted to reactor 11, where it is contacted with H₂O and Cl₂ introduced at 12 and 13 respectively. The mixture of H₂SO₄ and HCl produced by the ensuing reaction is conducted from reactor 11 to leaching vat 9 through conduit 14. The resulting solution of metal sulphates and chlorides is conducted through conduit 15 to iron scrap container 16. The residual solution of $FeSO_4$ and $FeCl_2$ is evacuated through conduit 17. The precipitated metals are conducted by conveyer 18 to the metals-separation step to be discussed later.

The solids remaining after the leaching step, after drying by means not indicated, which may make use of flue gases from the previous furnaces, are passed to the second or tin reduction furnace 19. If carbon is the reducing agent employed, the carbon is conducted to furnace 19, by means of conveyers 6 and 20. The CO liberated by the reduction escapes at 21. Molten tin and other metals, if any, are drained away from furnace 19 through conduit 22 to melting pot 23.

The solid residues from furnace 19 are transferred to the third or silicon reducing furnace 24. Carbon is introduced into furnace 24 by conveyers 6 and 25. Lime is conducted from bin 3 to furnace 24 by conveyer 26. The CO produced by the reduction reaction escapes at 27.

The molten products from furnace 24 are transferred to tapping molds 28. After solidifying, the slag is broken away and discarded at 29. The lumps of ferrosilicon and tin are then transferred to liquating table 30. The solids from table 30 are transferred by conveyer 31 to vat 32, where they are leached with HCl introduced at 33. The resulting $SnCl_2$ is returned through conduit 34 to container 35, where it is contacted with lime introduced thereto from bin 3. The resulting $CaSnO_3$ is led to tin reduction furnace 19 through conduit 36.

The solids left after the HCl leaching in container 32 are transferred to crusher 37, where they are crushed, preferably to about a 2 inch size, in which form this material is packed for the market.

The tin in melting pot 23, if found to be of commercial purity, is run directly into ingot molds 39. Otherwise the tin is run into anode molds 40. The anodes from mold 40 are set up in electrolytic cells indicated at 41, where the pure tin is transferred by electrolysis in a bath of $SnSO_4$ to the cathode, leaving behind any other metals that may be present, supported by a core of tin. These metals are transferred by conveyer 42 to the metals-separating step, which may be quite complicated, but in the figure is comprehensively represented at 43. The core of tin is returned to liquating table 30 by conveyer 46.

The cathodes from electrolytic cells 41 are transferred to furnace 44 and there melted. Any tin that may become oxidized in this process is returned through conveyer 45 to furnace 19. The balance of the molten tin is run into ingot molds 39, already referred to. The resulting ingots, of a purity of 99.9 per cent, are ready for the market.

I may not always wish to allow the major part of the iron to go to waste as $FeSO_4$ and $FeCl_2$ at point 17. In that case, I may leach out only a part of the iron in leaching vat 9. I may even prefer to recover all the iron as ferrosilicon. In that case the leaching step may be omitted altogether. This permits the iron and tin to be reduced, one after the other, in either order, depending upon the reducing agent employed, in one operation and in the same furnace. Vat 9, iron scrap container 16 and tin reduction furnace 19 may then be omitted from the apparatus, which remains otherwise the same. This process is not only simpler than that illustrated but also produces more of the valuable byproduct ferrosilicon, and is on that account at present preferred.

It should be noted that, although it is quite practicable to reduce the iron and tin together in one furnace, it is impracticable to reduce iron, tin and silicon together in one furnace of the electric type, as such furnaces are at present constructed. This is because the absorption of heat in the reduction of the iron and tin would prevent the development of the temperatures necessary for reduction of the silicon, at least until the iron and tin had been completely reduced.

Since in my process no tin is lost as $FeSn_2$, it will be evident that I am able to process ores containing relatively large proportions of iron and correspondingly small proportions of tin. In fact, by suitable adaptation of the process I am able to recover the values from tailings discarded from the processes of the prior art containing as little as 8½ per cent tin and as much as 17 per cent iron.

Although I have illustrated my process as carried out with the aid of an electric furnace for the reduction of silicon, I do not wish to be limited to that type of furnace, as other types of furnace can be adapted to the same purpose.

I have described my process as applied to the smelting of a typical ore, containing, besides the iron and tin, such other metals as lead, arsenic, antimony, silver, bismuth, etc., with the tin largely predominating. In this particular case, the chief value is in the tin; the iron, however, constituting an important byproduct and the other metals secondary byproducts of more or less value. It will be evident that such ores vary greatly in composition, and that in particular cases one of the metals other than tin might constitute the chief value. In such case I may put the ore through the same process and recover the metal other than tin from the anode slime. If lead is an important constituent of the material to be processed, I may allow it to go through to the anode of the electrolytic cell and electrolyze the anode in a bath of $SnSiF_6$ and $PbSiF_6$, thus depositing a solder at the cathode.

I claim as my invention:

1. In the processing of materials containing oxides of iron and tin, the steps which comprise: reducing the iron and tin to the metallic state, in presence of alumina, while avoiding melting of the iron; then, in another furnace zone, melting silicon with the iron, in presence of the alumina and tin; and finally slagging the alumina and separating the resulting slag, ferrosilicon and tin.

2. In the processing of materials containing oxides of iron and tin, the steps which comprise: reducing the iron and tin to the metallic state, in presence of alumina, while avoiding melting of the iron; then, in another furnace, melting silicon with the iron, in presence of the alumina and tin; and finally slagging the alumina and separating the resulting slag, ferrosilicon and tin.

3. In the processing of materials containing oxides of iron and tin, the steps which comprise: reducing the iron and tin to the metallic state, in presence of alumina, while avoiding melting of the iron, whereby a large part of the tin is trapped in the alumina; then, in another furnace zone, melting silicon with the iron, in presence of the alumina and tin; and finally slagging the alumina to release the tin and separating the resulting slag, ferrosilicon and tin.

4. In the processing of materials containing oxides of iron and tin, the steps which comprise:

reducing the iron to the metallic state, by means of carbon, in presence of alumina, below the temperature at which tin is reduced by carbon; then, in another furnace, reducing the tin to the metallic state, still in presence of the alumina, while avoiding melting of the iron; then, in still another furnace, melting silicon with the iron in presence of the alumina and tin; and finally slagging the alumina and separating the resulting slag, ferrosilicon and tin.

5. In the processing of materials containing oxides of iron and tin, the steps which comprise: reducing the iron and tin to the metallic state, in presence of alumina, below the temperature at which silica is reduced by the same reducing agent; then, in another furnace zone, reducing silica and melting the resulting silicon with the iron, in presence of the alumina and tin, while avoiding slagging of the alumina; and finally slagging the alumina and separating the resulting slag, ferrosilicon and tin.

6. In the processing of materials containing oxides of iron and tin, the steps which comprise: reducing the iron and tin to the metallic state, in presence of alumina, below the temperature at which silica is reduced by the same reducing agent; then adding silica and, in another furnace zone, reducing the silica and melting the resulting silicon with the iron, in presence of the alumina; and tin, while avoiding slagging of the alumina; and finally slagging the alumina and separating the resulting slag, ferrosilicon and tin.

7. In the processing of materials containing oxides of iron and tin, the steps which comprise: reducing the iron and tin to the metallic state, in presence of alumina and silica, at not over 950° C.; then, in another furnace zone, reducing the silica and melting the resulting silicon with the iron, in presence of the alumina and tin, while avoiding slagging of the alumina; and finally slagging the alumina and separating the resulting slag, ferrosilicon and tin.

8. In the processing of materials containing oxides of iron and tin, the steps which comprise: reducing the iron and tin to the metallic state, in presence of alumina and silica, at not over 950° C.; adding an alkaline each flux and, in another furnace zone, reducing the silica and melting the resulting silicon with the iron, in presence of the alumina, flux and tin, while avoiding slagging of the alumina; and finally slagging the alumina and separating the resulting slag, ferrosilicon and tin.

9. In the processing of materials containing oxides of iron and tin and an earthy constituent, including alumina and silica, slagging above the melting point of iron, the steps which comprise: reducing the iron and tin to the metallic state, at not over 950° C.; then, in another furnace zone, reducing the silica and melting the resulting silicon with the iron, in presence of the alumina and tin, while avoiding slagging of the alumina; and finally slagging the alumina and separating the resulting slag, ferrosilicon and tin.

10. In the processing of materials containing oxides of iron and tin and an earthy constituent, including alumina and silica, slagging above the melting point of iron, the steps which comprise: reducing the iron and tin to the metallic state, at not over 950° C.; reducing the silica, in presence of the alumina and two previously reduced metals, in another furnace zone, while avoiding slagging of the alumina; melting the resulting silicon with the iron, in presence of the alumina and tin, in a third furnace zone; slagging the alumina, in a fourth furnace zone; and separating the resulting slag, ferrosilicon and tin.

11. In the processing of materials containing oxides of iron and tin and an earthy constituent, including alumina and silica, slagging above the melting point of iron, the steps which comprise: reducing the iron and tin to the metallic state, at not over 950° C.; then, in another furnace of the electric arc type, reducing the silica, in presence of the alumina and two previously reduced metals; melting the resulting silicon with the iron, in presence of the alumina and tin, in another furnace zone, while avoiding slagging of the alumina; slagging the alumina in a third furnace zone; and separating the resulting slag from the ferrosilicon and tin.

12. In the processing of material containing oxides of iron and tin the steps which comprise: reducing the iron and tin to the metallic state, in presence of alumina, while avoiding melting of the iron; then, in another furnace zone, melting silicon with the iron, in presence of the alumina and tin; and finally slagging the alumina; allowing the molten slag, ferrosilicon and tin to drain into a mold and segregate into three layers; and separating the tin and ferrosilicon from each other and the latter from the slag.

13. In the processing of materials containing oxides of iron and tin, the steps which comprise: reducing the iron to the metallic state, in presence of alumina, by means of carbon, below the temperature at which tin is reduced by carbon; leaching out a part of the reduced iron; reducing the tin to the metallic state, still in presence of the alumina, while avoiding melting of the iron; then, in another furnace zone, melting silicon with the iron, in presence of the alumina and tin; and finally slagging the alumina and separating the resulting slag, ferrosilicon and tin.

14. In the processing of materials containing oxides of iron and tin, the steps which comprise: reducing the iron and tin to the metallic state, in presence of alumina, while avoiding melting of the iron; draining away as much of the molten tin as will readily separate from the solid materials; then, in another furnace zone, melting silicon with the iron, in presence of the alumina and residual tin; and finally slagging the alumina and separating the resulting slag, ferrosilicon and tin.

15. In the processing of materials containing oxides of iron and tin, the steps which comprise: reducing the iron and tin to the metallic state, in presence of alumina, while avoiding melting of the iron; then, in another furnace zone, melting silicon with the iron, in presence of the alumina and tin; slagging the alumina; allowing the molten slag, ferrosilicon and tin to drain into a mold and segregate into three layers; separating the tin and ferrosilicon from each other and the latter from the slag; leaching the ferrosilicon with hydrochloric acid; treating the resulting solution of tin chloride with lime to precipitate calcium stannate and returning the calcium stannate to the process before the tin reduction step.

LUCIEN C. STURBELLE.